United States Patent
Jones et al.

(10) Patent No.: US 6,475,067 B1
(45) Date of Patent: Nov. 5, 2002

(54) DRY METHOD OF CONCRETE FLOOR RESTORATION

(75) Inventors: John A. Jones, Pottstown, PA (US); John J. Allen, Jr., Phoenixville, PA (US)

(73) Assignee: Budget Maintenance Concrete Services, Inc., Pottstown, PA (US)

( * ) Notice: Subject to any disclaimer, the term of this patent is extended or adjusted under 35 U.S.C. 154(b) by 0 days.

(21) Appl. No.: 10/016,407

(22) Filed: Dec. 11, 2001

(51) Int. Cl.⁷ .................................................. B24B 1/00
(52) U.S. Cl. ............................ 451/41; 125/39; 451/54; 451/58; 451/353; 451/456
(58) Field of Search ............................ 451/41, 28, 36, 451/37, 58, 60, 353, 38, 39, 40, 57, 359, 456; 125/1, 26, 38, 39

(56) References Cited

U.S. PATENT DOCUMENTS

| | | | |
|---|---|---|---|
| 3,934,377 A | 1/1976 | Tertinek | 51/177 |
| 4,295,243 A | 10/1981 | King | 15/320 |
| 4,317,314 A | 3/1982 | Carlstrom et al. | 51/177 |
| 4,614,063 A | 9/1986 | Crivaro et al. | 51/174 |
| 4,727,686 A | 3/1988 | Persson | 51/174 |
| 5,454,751 A | 10/1995 | Wiand | 451/526 |
| 5,605,493 A | 2/1997 | Donatelli et al. | 451/41 |
| 5,709,589 A | * 1/1998 | Boone | |
| 6,155,907 A | 12/2000 | Jones | 451/28 |

* cited by examiner

*Primary Examiner*—Timothy V. Eley
(74) *Attorney, Agent, or Firm*—Michael F. Petock, Esq.

(57) ABSTRACT

A dry method of concrete floor or concrete surface restoration uses the process of grinding a concrete surface to be resurfaced while extracting and retaining dust during the grinding process. The grinding process is repeated each time using finer grinding grit until a preselected degree of smoothness of the concrete surface is achieved. A sealer is applied to the concrete surface which has been ground to the predetermined degree of smoothness. In a preferred embodiment, two coats of sealer are applied and the sealer is preferably a water-based, odorless, penetrating alkaline siliconate solution. The method of the present invention limits down time to aisles and main areas during the restoration process, as well as limiting the dust and odor during the process to provide a lustrous smooth surface on the concrete.

8 Claims, No Drawings

DRY METHOD OF CONCRETE FLOOR RESTORATION

FIELD OF THE INVENTION

The present invention relates to a dry method of concrete floor restoration. More particularly, the present invention provides a method of providing excellent floor restoration while minimizing the mess and inconvenience caused by slurry grinding of concrete floors and other concrete surfaces.

BACKGROUND OF THE INVENTION

Concrete is a widely used and relatively inexpensive building material. However, concrete typically has a relatively rough or porous surface. Many times it is desirable to enhance the surface appearance to provide a smoother appearance with a luster.

Various attempts have been made in the prior art to improve the aesthetic appearance of the concrete surface as used in building materials. These have included various efforts including coloring of the concrete and stamping of designs into them. Also, previous work has been done in connection with creating a smooth and lustrous appearance to the concrete. However, these have involved grinding of the concrete using a polishing slurry. For example, see U.S. Pat. No. 6,155,907—Jones wherein a solution of diluted silicate compound is applied to the surface to form a polishing slurry as the surface is buffed or polished using a polishing machine. Also, see the prior art patents cited therein which refer to the use of a slurry for polishing stone floors and the like, for example U.S. Pat. No. 5,605,493 to Donatelli et al. and U.S. Pat. No. 5,454,751 to Wyand.

However, the use of a slurry makes a messy job site. The slurry is sloshed around during the grinding process. This is particularly troublesome where concrete floors or other concrete surfaces need to be refinished in existing buildings which may have structures such as shelves, counters and other business furnishings already installed. The slurry to some degree almost always unavoidably gets onto such business furnishings creating problems. Further, there is increased closure time of the business since the slurry creates problems which make it unsuitable to keep the business open even if the floor or other concrete surface is being done in sections.

SUMMARY OF THE INVENTION

An advantage of the present invention is that it provides an aesthetically pleasing, non-marking, low maintenance long term solution to floor and other concrete resurfacing.

Another advantage of the present invention is that it is a method which enables limited down time to aisles and main areas of a business during preparation and sealing of concrete surfaces.

Another advantage of the present invention is that there is limited dust during the grinding process.

Another advantage of the present invention is that there is no odor during the process.

Another advantage of the present invention is that tire marks are reduced.

Another advantage of the present invention is that a concrete surface refinished in accordance with the present invention provides lighting enhancement.

Another advantage of the present invention is that it provides immediate access to the floor or other concrete surface after sealing is enabled.

In accordance with the present invention, rehabilitation of existing exposed concrete floors and other surfaces is provided through a mechanical dust-free and water-free, flat grinding removal and resurface/polishing to meet a preselected degree of structural soundness and smoothness of the concrete surface.

Briefly and basically, in accordance with the present invention, a method of restoring a concrete surface is provided wherein there is grinding of the concrete surface to be resurfaced. Extraction and retention of dust during the grinding process is provided. The grinding process is repeated each time using finer grit until a preselected degree of smoothness of the concrete surface is achieved. Finally, a sealer is applied to the concrete surface which has been ground to the predetermined degree of smoothness.

In accordance with the present invention, the extraction of the dust may be provided by generating at least a partial vacuum or by suction. The grinding process may be repeated up to ten times, but in most applications it is repeated three to five times.

In a presently preferred embodiment, two coats of sealer are applied to the concrete surface.

In the presently preferred form of the invention, the concrete sealer is a water-based, odorless, penetrating alkaline siliconate solution.

DETAILED DESCRIPTION OF THE PREFERRED EMBODIMENTS

A concrete surface such as a wall or floor may be treated in accordance with the present invention by first grinding the concrete surface. Preferably, the grinding is carried out in a plurality of steps utilizing a finer grit during each grinding step. In a presently preferred form of practicing the invention, a diamond grinding system is utilized in the grinding process. The dry grinding is carried out using an apparatus which will create a vacuum or suction to remove the dust from the grinding and retain it in a container during the grinding process. The dust container may be emptied periodically.

In practicing the present invention in accordance with the preferred method, a grinding machine known as a HTC-800 available from HTC Sweden AB—Box 69-614 22 Soderkoping, Sweden is presently preferred. However, it is understood that other grinding machines may be utilized. The HTC-800 is commercially available in the United States through Innovatech, 19722 144th Ave. N.E., Woodinville, Wash. 98072. The HTC-800 utilizes three grinding disks that rotate in one direction, and are mounted on a larger disk which rotates in the opposite direction. The smaller grinding disks may rotate up to 1300 revolutions per minute. This makes the machine easy to handle and control when producing a smooth even surface.

The grinding may be carried out on portions of a floor while other portions of the same floor are being utilized for the conduct of business. This is made possible because the grinding is carried out and the dust and dirt are removed by vacuum or suction as the grinding is carried out. Rehabilitation of existing exposed concrete floors is provided through mechanical dust-free and water-free, flat grinding removal and resurfacing/polishing. The grinding is carried out until a preselected degree of structurally sound and smooth concrete surface is obtained.

Once the concrete surface, such as the concrete floor, is ground to the preselected degree of smoothness, a water-based, odorless, penetrating alkaline siliconate solution is applied. A presently preferred form of this solution is commercially available under the trademark "SEAL HARD" from L & M Construction Chemicals, Inc., 14851 Calhoun Road, Omaha, Nebr. 68152. However, it is understood that any other suitable water-based, odorless, penetrating alkaline siliconate solution may be utilized in practicing the present invention. In a presently preferred embodiment, two coats of the water-based, odorless, penetrating alkaline siliconate solution are applied.

In summary, all exposed concrete surface is prepared through the mechanical means of an HTC-800 dust-free flat grinding machine. Rotating diamond grinding disks remove existing floor coatings or smooth out ruts or pitted concrete floor slabs. Additional grinding steps are required to polish the surface from a satin finish to a marble-like luster.

After the grinding process is complete, preferably two coat application of the waterbased, odorless, penetrating alkaline siliconate solution is applied.

Typically, the grinding process is carried out in three, four or five steps. However, the grinding process could be continued up to ten steps, depending upon the degree of smoothness and lustre of the desired floor.

Before the aforesaid process is initiated, the floor is evaluated and if there are non moving cracks and joints, the cracks and joints are cleaned out and filled with a rapid setting joint compound. In a presently preferred embodiment, the rapid setting joint compound is commercially available under the name L&M Joint Tite 750, which is commercially available from L&M Construction Chemicals, Inc. As indicated above, the next step takes the rough floor surface and soothes it out with a series of dry, dust-free grinding steps. In this step old coatings are removed and rough concrete is brought to a flat reflective finish. The degree of polish and reflection is dependant upon the number of passes of progressively finer grinding stones, such as diamond stones. The grinding process is performed without water and is dust-free due to the suction or vacuum. The dry, dust-free grinding is presently preferably carried out using the HTC-800 machine. As indicated above, preferably, two coats of SEAL HARD water-based, odorless, penetrating alkaline siliconate solution are applied.

This refinishing process may be applied to new floors or to refurbishing of old floors. In most cases, the process may be carried out on a floor in a currently operating business without requiring a shut down of the normal daily operations due to the fact that the full operation may be carried out within one shift or an eight hour period overnight. Alternatively, sections of the floor may be closed if the refinishing process is going to be done during the normal work day.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. A method of restoring a concrete surface, comprising:
   dry grinding a concrete surface to be resurfaced using a grinding grit;
   extraction and retention of dust generated during the grinding process;
   repeating the dry grinding process each time using a finer grinding grit until a preselected degree of smoothness of said concrete surface is achieved; and
   applying a sealer to said concrete surface which has been ground to the predetermined degree of smoothness.

2. A method in accordance with claim 1 wherein said step of extraction is by means of generating at least a partial vacuum to remove dust during the grinding process.

3. A method in accordance with claim 1 wherein said step of extraction of dust during the grinding process is by means of suction.

4. A method in accordance with claim 1 herein the repeating of the grinding process is carried out two to five times.

5. A method in accordance with claim 1 wherein said repeating of the grinding process is carried out nine times.

6. A method in accordance with claim 1 wherein said grinding process is carried out using a diamond grinding system.

7. A method in accordance with claim 1 wherein said sealer is a water-based, odorless, penetrating alkaline siliconate solution.

8. A method in accordance with claim 7 wherein a second coat of said water-based odorless, penetrating alkaline siliconate solution is applied.

* * * * *